United States Patent [19]

DeCastri

[11] 4,031,772

[45] June 28, 1977

[54] NIGHT/DAY REARSIDE VIEW MIRROR

[76] Inventor: Glenn DeCastri, 32 Circle Drive, Glen Cove, N.Y. 11542

[22] Filed: June 22, 1976

[21] Appl. No.: 698,706

[52] U.S. Cl. .............................. 74/501 M; 350/280
[51] Int. Cl.² .......................................... F16C 1/10
[58] Field of Search .................... 74/501 R, 501 M; 251/294; 350/280, 279, 281

[56] References Cited

UNITED STATES PATENTS

| | | | |
|---|---|---|---|
| 1,781,999 | 11/1930 | Bittinger | 350/280 |
| 2,696,142 | 12/1954 | Langford | 74/501 R |
| 3,390,588 | 7/1968 | Savage | 74/501 M |
| 3,588,231 | 6/1971 | Platzer | 74/501 R |

*Primary Examiner*—Clarence R. Gordon

[57] ABSTRACT

A rear view mirror having a pair of mirror panels with different reflective surfaces angularly disposed with respect to each other, one of which is used during the day, the other at night when driving, and means from within the vehicle to shift the mirror for use of either mirror panel.

8 Claims, 4 Drawing Figures

U.S. Patent  June 28, 1977  4,031,772
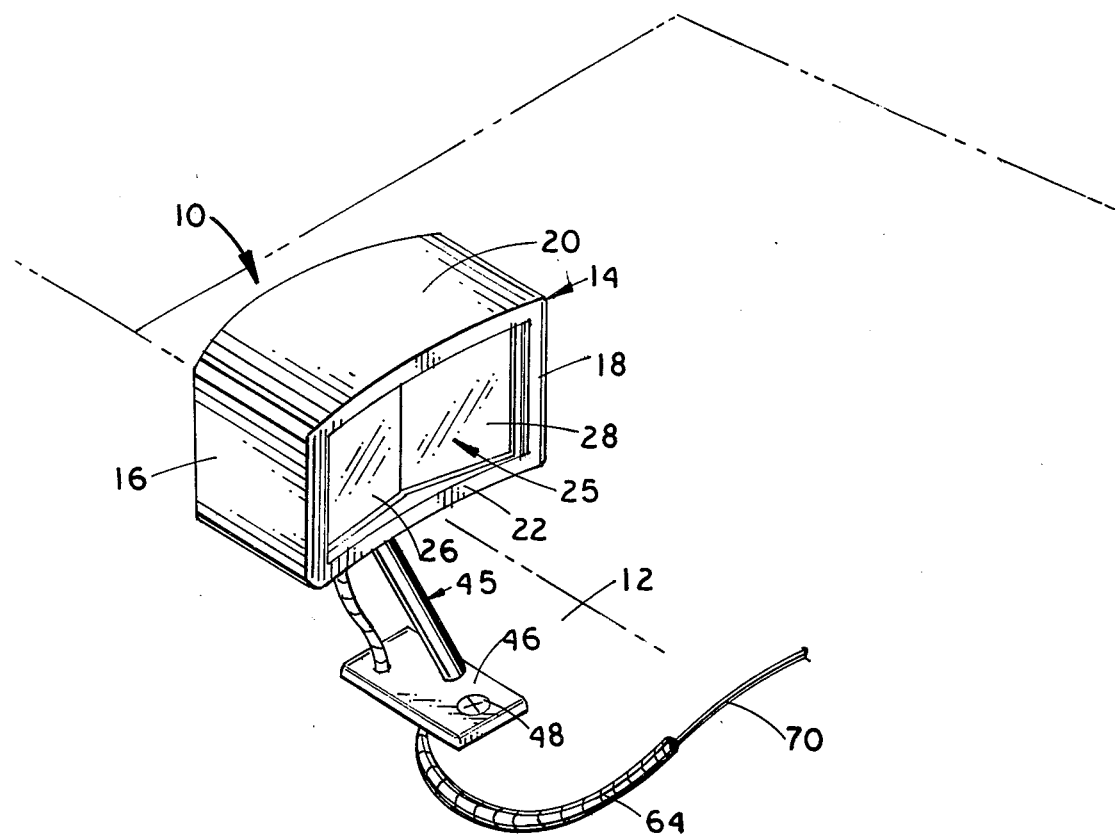
FIG. 1
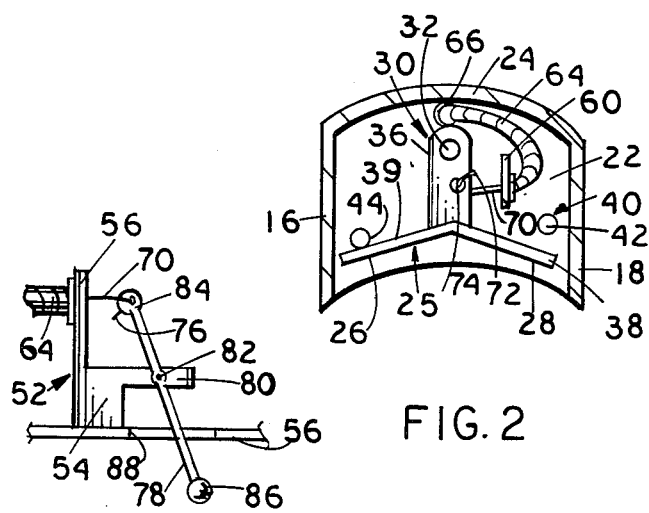
FIG. 2
FIG. 4
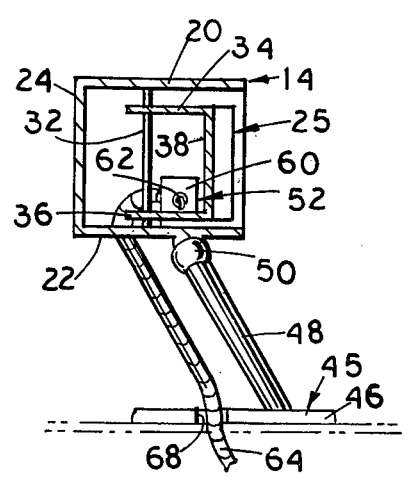
FIG. 3

NIGHT/DAY REARSIDE VIEW MIRROR

BACKGROUND OF THE INVENTION

This invention relates to a rear vision mirror and more particularly to a rear vision mirror for vehicles having a pair of selectively used reflecting surfaces, usually having different reflecting characteristics, any one of which may readily be presented in operative position.

The mirror of the present invention is to be used outside the vehicle for both day and night driving.

Objects of the Invention: One of the principal objects of the present invention is to provide a rear vision mirror provided with a pair of selectively used reflecting surfaces having different reflecting characteristics.

Another object is to provide a rear vision mirror of the type indicated wherein different reflecting surfaces may readily and easily be placed in operative position, and wherein such surfaces are accurately and stably retained in operative position.

Another object is to provide a rear vision mirror of attractive appearance and in which the reflecting surfaces are protecting against the wind, rain, snow, etc.

Another object is to provide a rear vision mirror of the type indicated which is of simple rugged construction and which is easily assembled.

Other objects and advantages of the invention will be apparent as the disclosure proceeds.

SUMMARY OF THE INVENTION

A rear vision mirror assembly for use on a vehicle is disclosed that includes a housing open at one end with a vertically disposed mirror including a pair of mirror panels angularly positioned relative to each other and having reflective faces of different values of intensity. The mirror is rotatably supported in the housing with the mirror panels facing the open end of the housing for rotation about an upright axis between a first position for use to a second position in which the other of the mirror panels is brought into reflective position for use. The supporting means includes a pivot member extending vertically in the housing, and a first arm secured to the mirror at one end thereof and rotatably mounted relative to the pivot member at the opposite end thereof.

Stop means is mounted within the housing to limit the path of travel of the mirror between the first and second positions, one of which is the day position the other being the night position. Mounting means is provided to connect the housing in fixed position relative to the vehicle associated therewith. Controlling means is also provided to control the movement of the mirror between the first and second positions from within the vehicle. The controlling means includes a bracket extending between the mirror and the pivot member adjacent the arm with a flexible tubular sheath secured to the bracket at one end thereof and having its opposite end extending within the vehicle. A flexible cable is positioned within the sheath and secured at one end thereof to the arm between the mirror and the pivot member, and having its opposite end terminating within the vehicle, such that linear movement of the cable within the sheath applies a force to effect angular displacement of the arm for movement between the first and second positions.

In addition means for retaining the end of the sheath in the vehicle in fixed position may be provided with a lever mounted within the vehicle for angular displacement, and means for connecting the end of the cable in the vehicle to one end of the lever, such that the free end of the lever may be manipulated by the driver to obtain the linear movement of the cable with the sheath to thereby obtain the angular movement of the mirror.

BRIEF DESCRIPTION OF THE DRAWING

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like part throughout the several views and in which:

FIG. 1 is a perspective view of the rear vision mirror embodying the present invention;

FIG. 2 is a top sectional view showing the mirror relative to the stop means;

FIG. 3 is a side view partly in section showing the mirror positioned within the housing; and FIG. 4 is a view illustrating the controls to adjust the mirror contained within the vehicle.

DETAILED DESCRIPTION OF THE PREFERRED EMBODIMENT

FIGS. 1-4 illustrate a rear vision mirror assembly 10 for use on a vehicle 12 that may include a housing 14 made of metal or plastic material. The housing 14 is seen to include a pair of substantially vertically extending side walls 16 and 18 with a top walls 20 and bottom wall 22 having a rear wall 24 all joined together with an open end spaced from the rear wall 24 in order to be able to view the vertically disposed mirror 25 positioned within the housing 14. The mirror 25 includes a pair of mirror panels 26 and 28 positioned relative to each other and having reflective faces of different values of intensity. The angle defined by the mirror 25 as seen in FIG. 2 is selected to permit the mirror 25 to be supported in a first position as seen in FIG. 2 in which the panel 26 may be utilized, which for purposes of discussion will be designated as the daytime panel. A second position is provided in which the panel 28 is brought into use, which for purposes of discussion may be considered the night panel.

To permit movement of the mirror 25 between the first and second positions supporting means 30 is provided such that the mirror 25 is rotatably mounted with the mirror panels 26 and 28 facing the open end of the housing 14. The supporting means 30 includes a pivot member 32 that as seen in FIG. 3 may extend between the upper wall 20 and lower wall 22 and may be in the form of a circular member. Positioned on the pivot member 32 are a pair of arms 34 and 36 that may be spaced from each other and extend outwardly from a vertically extending mirror supporting surface 38 having back surface 39. The respective mirror panels 26 and 28 may be formed or secured to the supporting surface 38 in a manner well known.

By providing the first arm 34 and second arm 36 in spaced relation to each other the mirror 25 is free to rotate about the axis of the pivot member 32.

In order to limit the travel of the mirror 25 between its first position and second position stop means 40 as seen in FIG. 2 is provided and mounted within the housing 14 to limit the path of travel of the mirror 25 between the first and second positions. The stop means 40 includes a pair of spaced apart vertically extending tabs 42 and 44 that are disposed rearwardly of the mirror 25 as by securement to the wall 22. The back surface 39 abuts each of the tabs 44 and 42 when the mirror 25 comes to rest in the first or second positions respectively. As seen in FIG. 2 the panel 26 is in position and has the support plate 38 abutting tab 44. In similar fashion tab 42 acts as a stop in the movement of night panel 28 when the mirror 25 is brought into the second position.

In order to maintain the mirror assembly in fixed position to the vehicle 12 mounting means 45 is provided as seen in FIG. 3 and may include a plate 46 secured as by a screw 48 to the vehicle 12 and having a support member 48 extending from the plate 46 and connected as by a swivel joint 50 to the bottom wall 22 of the housing 14. This permits gross adjustment of the housing 14 by the driver of the vehicle 12.

The driver of the vehicle is provided with controlling means 52 illustrated in FIG. 4 to permit manual adjustment of the mirror between the first and second positions from within the vehicle. The controlling means 52 includes bracket or holder 54 that may be secured to the dashboard 56 or other part of the inside of the vehicle. The brace 54 includes an upwardly extending neck portion 56. Within the housing 14 and which may be secured to the bottom wall 22 is a bracket 60 having an aperture 62 extending therethrough. A flexible tubular sheath 64 extends between the neck portion 56 within the vehicle and the bracket 60 within the housing 14. The sheath 64 exits the housing 14 through an aperture 66 on the bottom wall 22 and through a corresponding aperture 68 on plate 46. Mounted within the sheath 64 is a flexible cable 70 secured at one end 72 through an opending 74 within the arm 36 as seen in FIGS. 2 and 3. The opposite end 76 of the flexible cable 70 exits past the neck portion 56 and is secured to a lever 78.

The lever 78 is mounted within the vehicle for angular displacement as by mounting on a rib 80 that extends outwardly from neck 56 and has a pin 82 extending through the lever 78 and rib 80. The cable 70 is secured to the lever at one end 84, and the opposite end 86 is free to be manually controlled by the driver with the free end 86 extending through an opening 88 in the dashboard 56. In this manner movement of the lever actuator 78 effects linear movement of the cable 70 within the sheath 64 which movement is transmitted by the end 72 of the cable 70 to the arm 36 in a manner to effect angular displacement of the mirror 25 between its first and second positions.

Although an illustrative embodiment of the invention has been described in detail herein with reference to the accompanying drawings, it is to be understood that the invention is not limited to the precise embodiment, and that various changes and modifications may be effected therein without departing from the scope or spirit of the invention.

I claim:

1. A rear vision mirror assembly for use on a vehicle, comprising:
   A. a housing open at one end,
   B. a vertically disposed mirror including a pair of mirror panels angularly positioned relative to each other and having reflective faces of different values of intensity,
   C. means for rotatably supporting said mirror with said mirror panels facing the open end of said housing for rotation about an upright axis between a first position in which one of said mirror panels is brought into reflective position for use to a second position in which the other of said mirror panels is brought into reflective position for use, said supporting means including:
      i. a pivot member extending vertically in said housing, and
      ii. a first arm secured to said mirror at one end thereof and rotatably mounted relative to said pivot member at the opposite end thereof,
   D. stop means mounted within said housing to limit the path of travel of said mirror between the first and second positions,
   E. means for mounting said housing in fixed position relative to the vehicle associated therewith, and
   F. means for controlling the movement of said mirror between said first and second positions from within the vehicle, said controlling means includes,
      i. a bracket extending between said mirror and said pivot member adjacent said arm,
      ii. a flexible tubular sheath secured to said bracket at one end thereof and having its opposite end extending within the vehicle, and
      iii. a flexible cable positioned within said sheath and secured at one end thereof to said arm between said mirror and said pivot member, and having its opposite end terminating within the vehicle, such that linear movement of said cable within said sheath applies a force to effect angular displacement of said arm for movement between said first and second positions.

2. A rear vision mirror as defined in claim 1, wherein said controlling means further includes:
   A. means for retaining the end of said sheath in the vehicle in fixed position,
   B. a lever mounted within the vehicle for angular displacement, and
   C. means for connecting the end of said cable in the vehicle to one end of the lever, such that the free end of the lever may be manipulated by the driver to obtain the linear movement of said cable within said sheath to thereby obtain the angular movement of said mirror.

3. A rear view mirror as defined in claim 1, wherein said stop means includes a pair of spaced apart vertically extending tabs rearwardly disposed of said mirror, such that one of said panels abuts one of said tabs in the first position and the other panel abuts the other tab in the second position of the mirror.

4. A rear view mirror as defined in claim 1, wherein said means for mounting said housing includes:
   A. a plate adapted to be secured to the exterior of the vehicle, and
   B. a support member secured at one end thereof to said plate, and pivotably mounted to the housing at its opposite end, such that the driver may adjust the position of the mirror assembly.

5. A rear view mirror as defined in claim 1,
   A. wherein in the first position the night mirror panel is positioned for use, and
   B. wherein in the second position the day mirror panel is positioned for use.

6. A rear view mirror as defined in claim 1, wherein said means for rotatably supporting said mirror further includes:
   A. a vertically extending mirror supporting surface having inclined surfaces angularly disposed with respect to each other and containing thereon said pair of mirror panels and secured to said first arm, and B. a second arm in spaced relation to said first arm and secured at one end to said mirror supporting surface and mounted on said pivot member.

7. A rear view mirror as defined in claim 1,

A. wherein said controlling means further includes:
 i. means for retaining the end of said sheath in the vehicle in fixed position,
 ii. a lever mounted within the vehicle for angular displacement, and
 iii. means for connecting the end of said cable in the vehicle to one end of the lever, such that the free end of the lever may be manipulated by the driver to obtain the linear movement of said cable within said sheath to thereby obtain the angular movement of said mirror.

B. wherein said stop means includes a pair of spaced apart vertically extending tabs rearwardly disposed of said mirror, such that one of said panels abuts one of said tabs in the first position and the other panel abuts the other tab in the second position of the mirror, C. wherein said means for rotatably supporting said mirror further includes:
 i. a vertically extending mirror supporting surface having inclined surfaces angularly disposed with respect to each other and containing thereon said pair of mirror panels and secured to said first arm,
 ii. a second arm in spaced relation to said first arm and secured at one end to said mirror supporting surface and mounted on said pivot member, D. wherein said means for mounting said housing includes:
 i. a plate adapted to be secured to the exterior of the vehicle, and
 ii. a support member secured at one end thereof to said plate, and pivotably mounted to the housing at its opposite end, such that the driver may adjust the position of the mirror assembly.

8. A rear view mirror as defined in claim 7,

A. wherein in the first position the night mirror panel is positioned for use, and B. wherein in the second position the day mirror panel is positioned for use.

* * * * *